(12) United States Patent
Lehmann

(10) Patent No.: US 7,654,478 B1
(45) Date of Patent: Feb. 2, 2010

(54) TRASH HARVESTER APPARATUS AND METHOD

(76) Inventor: Leroy C. Lehmann, 7478 Old Bay Pointe Rd., Milton, FL (US) 32583

( * ) Notice: Subject to any disclaimer, the term of this patent is extended or adjusted under 35 U.S.C. 154(b) by 202 days.

(21) Appl. No.: 11/879,981

(22) Filed: Jul. 19, 2007

(51) Int. Cl.
*B02C 21/02* (2006.01)

(52) U.S. Cl. .......... 241/24.14; 241/29; 241/78; 241/79.1; 241/101.742; 241/160

(58) Field of Classification Search .......... 241/101.741, 241/101.742, 101.763, 101.77, 24.14, 24.2, 241/79.1, 29, 160, 78; 15/82–86
See application file for complete search history.

(56) References Cited

U.S. PATENT DOCUMENTS 4,852,815 A * 8/1989 Giannotti .................... 241/65

5,577,286 A * 11/1996 Smith et al. ................. 15/84
6,305,625 B1 * 10/2001 Talamantez et al. ..... 241/101.71

* cited by examiner

*Primary Examiner*—Mark Rosenbaum
(74) *Attorney, Agent, or Firm*—J. Nevin Shaffer, Jr.

(57) ABSTRACT

A trash harvester apparatus and method includes a trash grabber. At least one trash shredder for shredding trash from the trash grabber is connected with the trash grabber. A magnetic device for picking magnetic trash from the trash is provided where the magnetic device is connected with a first receptacle for containing the magnetic trash. An auger device for moving non-magnetic trash is provided where the auger device is connected with a second receptacle for containing the non-magnetic trash.

17 Claims, 5 Drawing Sheets

TRASH HARVESTER APPARATUS AND METHOD

FIELD OF THE INVENTION

This invention relates to a trash harvester apparatus and method for use in collecting trash. In particular, in accordance with one embodiment, the invention relates to a trash harvester apparatus including a trash grabber. At least one trash shredder for shredding trash from the trash grabber is connected with the trash grabber. A magnetic device for picking magnetic trash from the trash is provided where the magnetic device is connected with a first receptacle for containing the magnetic trash. An auger/conveyor device for moving non-magnetic trash is provided where the auger device is connected with a second receptacle for containing the non-magnetic trash.

BACKGROUND OF THE INVENTION

Debris, paper, plastic materials, glass materials, wood, small pieces of magnetic material, non magnetic cans, tire treads and the like, that accumulate along the side of roads and highways is normally picked up by manual labor. In the timber industry, debris, limbs and tree tops, are normally left to decay or burned once the timber is harvested. If burned, the debris is raked into piles using bull dozers with rakes and allowed to dry before it is burned.

In general, the removal of debris is a necessary "evil" because it presents an unsightly appearance and can be a health hazard. Again, the most used method of debris removal is manual labor which is expensive, time consuming and potentially hazardous to the laborers. Mechanical devices have been developed for the automatic pick up of roadside trash. U.S. Pat. No. 5,577,286 issued to Smith et al. is an example of the type of mechanical prior art devices of which Applicant is aware. Smith et al. discloses using a rotating set of rubber fingers to pick up the trash and another set of fingers to pick the trash off of the rotating fingers. The trash is deposited onto a fast moving conveyor belt that literally throws the trash to the back of a truck. The truck surrounds the conveyor belt and thus presents a mechanically complex problem when repairs are required or the truck is to be emptied. Smith et al. does not disclose any treatment of the trash or trash residue and the trash is never segregated by the system.

Thus, there is a need in the art for a trash removal device that is easy to use and maintain, that is easy to empty when full and which treats the trash upon pickup. Further, there is a need for a trash removal device that segregates trash and which does not spew pollutants into the environment. It therefore is an object of this invention to provide a trash harvester system for the collection of debris that treats the trash on pick up, that segregates the trash when desired, that limits air pollution created by the use of the system and which is easy to empty when full.

SUMMARY OF THE INVENTION

Accordingly, a trash harvester apparatus and method, in accordance with one embodiment, includes a trash grabber. At least one trash shredder for shredding trash from the trash grabber is connected with the trash grabber. A magnetic device for picking magnetic trash from the trash is provided such that the magnetic device is connected with a first receptacle for containing the magnetic trash. And an auger device for moving non-magnetic trash is provided such that the auger device is connected with a second receptacle for containing the non-magnetic trash.

As used herein, the term "trash" includes roadside debris and debris created from the process of cutting timber, as described above. Obviously, any loose material found on the ground that is not intended to be on the ground is included within the term debris. Further, "magnetic trash" includes trash comprised in whole or in part of some metal whether steel, iron, or any other magnetic material now known or hereafter developed.

According to another aspect of the invention, at least one filter is provided and is connected with at least one of the receptacles. In another aspect, an exhaust is connected with the filter. In another aspect, a first filter and a second filter are provided such that trash is deposited by the first filter into at least one of the receptacles and air from that receptacle is drawn through the second filter by the exhaust. In a further aspect, a filter cleaner is connected with the at least one filter. In one aspect, the at least one receptacle is air tight and detachable.

According to another aspect of the invention, a first trash shredder and a second trash shredder are provided such that the first trash shredder feeds trash to the second trash shredder and the second trash shredder feeds trash to the auger device. In another aspect, the magnetic device is a magnetized conveyor conformed to pass in proximity to the trash. In a further aspect, a ground sensor is connected with the trash grabber for sensing the distance of the trash grabber from the ground.

In accordance with another embodiment of the invention, a trash harvester apparatus includes a trash grabber. At least one trash shredder is provided for shredding trash from the trash grabber and is connected with the trash grabber. An auger device is provided for moving trash such that the auger device is connected with at least one receptacle for containing the trash. At least one filter is connected with at least one receptacle and an exhaust is connected with the at least one filter.

In another aspect, a first filter and a second filter are provided such that trash is deposited by the first filter into the at least one receptacle and air from the at least one receptacle passes through the second filter. In a further aspect, a filter cleaner is connected with the at least one filter. In another aspect, the at least one receptacle is air tight and detachable.

In another aspect, a ground sensor is connected with the trash grabber for sensing the distance of the trash grabber from the ground. According to a further aspect, a magnetic device for picking magnetic trash from the trash is provided such that the magnetic device is connected with a first receptacle for containing magnetic trash and where the auger device moves non-magnetic trash and is connected with a second receptacle for containing the non-magnetic trash. In another aspect, the magnetic device is a magnetized conveyor conformed to pass in proximity to the trash.

According to another embodiment of the invention, a method of harvesting trash includes the steps of providing a trash harvester including a trash grabber with at least one trash shredder for shredding trash from the trash grabber connected with the trash grabber, an auger device for moving trash where the auger device is connected with at least one receptacle for containing the trash, at least one filter connected with at least one receptacle and an exhaust connected with the at least one filter; and operating the trash harvester so as to pick up trash and deposit the trash into the at least one receptacle.

According to another aspect of the invention, the trash harvester further includes a magnetic device for picking magnetic trash from the trash where the magnetic device is connected with a first receptacle for containing the magnetic trash and where the auger device moves non-magnetic trash and the auger device is connected with a second receptacle for containing the non-magnetic trash. In another aspect, the trash harvester further includes a first filter and a second filter where the trash is deposited by the first filter into the at least one receptacle and air from the at least one receptacle passes through the second filter. In a further aspect, the at least one receptacle is detachable and the method further includes the steps of removing and emptying the at least one receptacle when full of trash.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
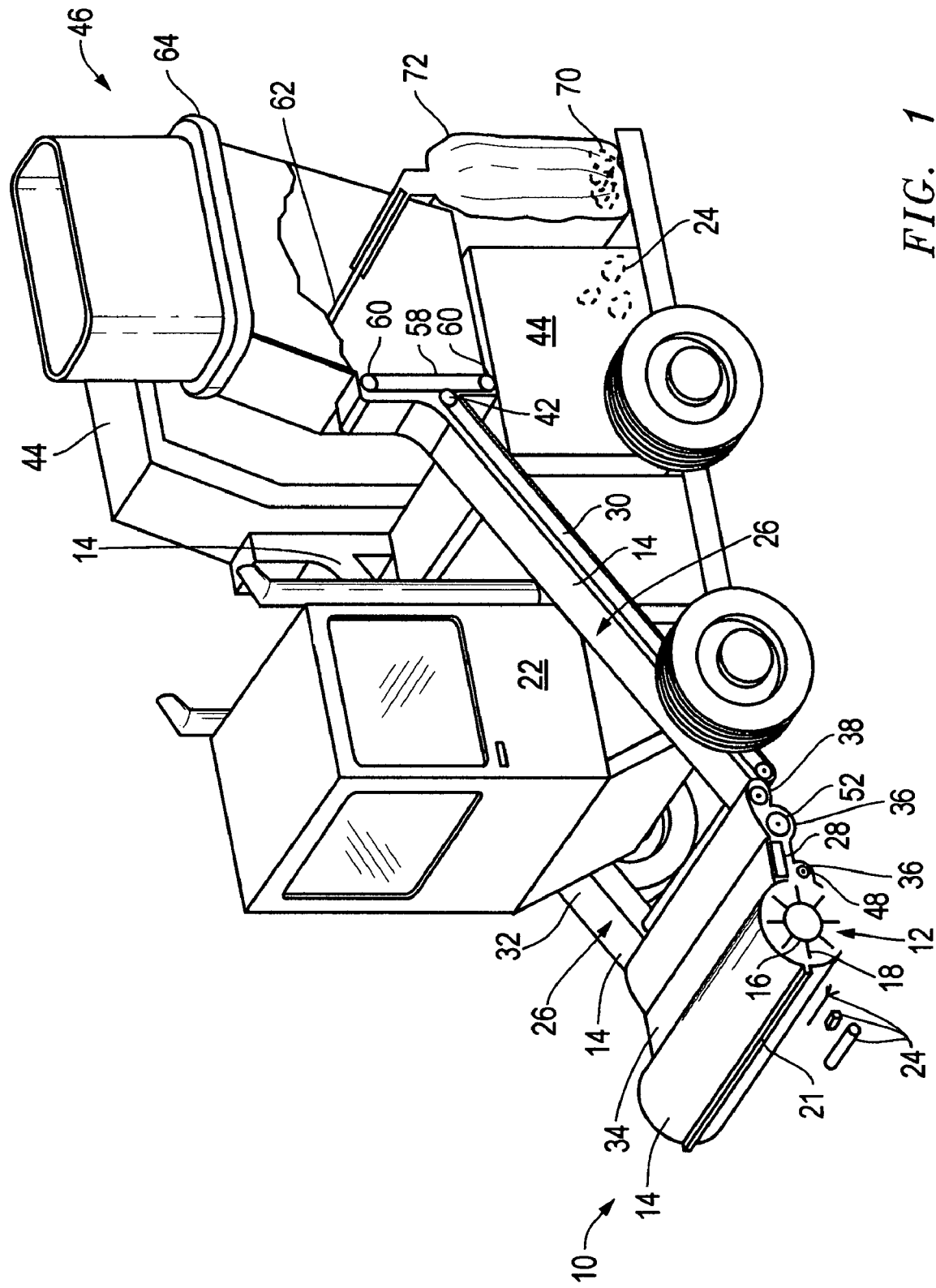
FIG. 1 is a side perspective view of a trash harvester according to one embodiment of the invention.

The preferred embodiment of the present invention is illustrated by way of example in FIGS. 1-5. With specific reference to FIGS. 1 and 2, trash harvester 10, according to one embodiment, includes trash grabber 12. Trash grabber 12 is supported within frame 14 which also serves to contain trash 16 within trash harvester 10 during the pick up process as will be disclosed more fully hereafter. Frame 14 encloses or covers the various parts of the apparatus but is not shown completely in the Figures in order not to obscure the other details of the invention.

Trash grabber 12 includes a cylindrical support 16 to which are attached extensions 18. Cylindrical support 16 preferably is a twelve inch diameter drum. Extensions 18 are preferably six inch grabber bars removably mounted, by screw threads, bolts, or the like, on support 16. The extensions 18 may be sharpened and coated with protective rubber or plastic as found useful. Any desired pattern of extensions 18 on support 16 may be created such that a predetermined area of ground 20 is covered with each revolution of support 16.

Trash harvester 10 is shown connected with vehicle 22. As illustrated, trash harvester 10 may be driven over trash 24 from the front of the vehicle such that the driver of the vehicle 22 has a complete and accurate view of the trash 24 to be picked up and the operation of trash harvester 10 at the same time. Certainly, trash harvester 10 may be drawn behind vehicle 22 or even beside it in obvious variations of the preferred configuration. The connection of the trash harvester 10 to the vehicle 22 is well within the ability of those of ordinary skill and not disclosed more fully hereafter. Likewise, motors and connections necessary to rotate cylindrical support 16 and other moving parts of the trash harvester 10 are not described in detail in order not to confuse the illustrations unnecessarily.

Referring to FIG. 1, three conveyors 26 are illustrated, central conveyor 28, left hand conveyor 30, and right hand conveyor 32. As used herein the term "conveyor" includes a conveyor belt system as known and illustrated. Obviously, any conveyor system, belt or otherwise, now known or hereafter developed suitable for the purpose of moving trash 24 picked up by the trash harvester 10 is acceptable. Again, as mentioned above, frame 14 covers or encloses these elements of the invention.

FIG. 1 shows central conveyor 28 located next to trash grabber 12 and running the length of trash grabber 12. One conveyor 26, right hand conveyor 32 in this illustration, is shown adjacent one end 34 of central conveyor 28 as will be discussed more fully with regard to FIG. 3. FIG. 1 also shows a shredder 36 and an auger 38 located on the side 40 of central conveyor 28 opposite from trash grabber 12. Left hand conveyor 30 is shown next to the deposit end 42 of auger 28 as will be discussed more fully with regard to FIG. 2.

FIG. 1 also shows receptacles 44 connected with the deposit ends 42 of left hand conveyor 30 and right hand conveyor 32. Preferably, receptacles 44 are air tight and removably attached to trash harvester 10 or to vehicle 22 such that receptacles 44 may be removed and emptied, perhaps in the back 46 of vehicle 22, and reattached easily and quickly. Again the details of the manner of attaching the receptacles 44 is omitted in favor of clarity and are within the skill of those of ordinary ability.

Figure 2:
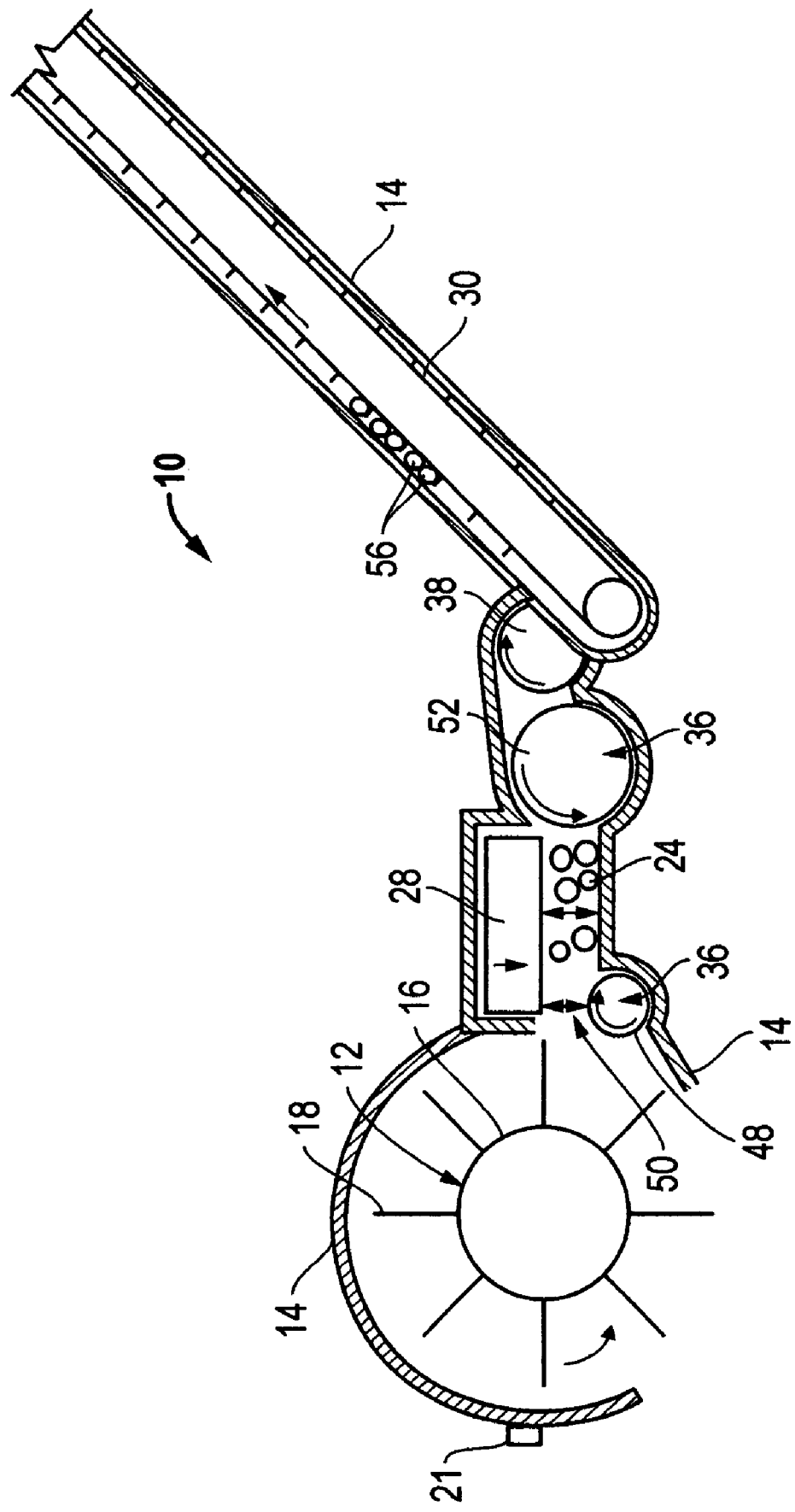
FIG. 2 is a is a side view of the left hand side of the front parts of the trash harvester of FIG. 1.

Referring now particularly to FIG. 2, a detailed view of the left side of the trash harvester 10 is presented. From this view, another embodiment of the invention is shown in which two shredders 36 are used. In this embodiment, first shredder 48 receives trash 24 from extensions 18 and "treats" the trash 24 initially by shredding and/or cutting it. Preferably, first shredder 48 is a four inch diameter shredder with tungsten carbide cutters, as known in the art and not described more fully hereafter. Such a shredder can chew a three by four piece of wood, for example only, into three inch pieces. Any shredder device now known or hereafter developed for cutting up trash may be suitable for the purposes of the invention. First shredder 48 runs the length of cylindrical support 16 and is positioned at the "mouth" 50 of trash harvester 10 formed by frame 14 as shown. Mouth 50 is created by frame 14 such that, as will be discussed more fully hereafter, air suction is created along the entire length of mouth 50 when an exhaust device is used with the invention.

After the initial treatment of the trash 24 by first shredder 48, the trash 24 is directed towards second shredder 52. It is important to note that central conveyor 28 passes in close proximity to trash 24 prior to trash 24 reaching second shredder 52. As used herein the term "close proximity" means near enough to trash 24 to be useful and may include even passing through trash 24. Preferably, central conveyor 28 is a "magnetized" conveyor in that it attracts metal to it. Any useful method and means for magnetizing central conveyor 28 is suitable as is known in the art. In operation, magnetized central conveyor 28 passes over once treated trash 24 and picks up and pulls out any magnetic trash 54. This magnetic trash 54 is carried to the right hand conveyor 32 and then into receptacle 44.

Non-magnetic trash 56 is then "treated" a second time by passing through second shredder 52. For example only and not by limitation, second shredder 52 chews three inch pieces from first shredder 48 into approximately one inch pieces. Thereafter, non-magnetic trash 56 is moved by auger 38 to left hand conveyor 30. Both second shredder 52 and auger 38, as shown in FIG. 1, run essentially the length of trash grabber 12 along side 40 of central conveyor 28. As used herein, "auger" is a device for moving material in a particular direction by rotational motion as is known in the art. Certainly, another conveyor may be used instead of auger 38 or any other device for moving the twice treated non magnetic trash 56 as desired.

FIG. 2 also shows ground sensor 21 connected with the leading end of frame 14 and trash harvester 10. Ground sensor 21 detects the distance of the trash grabber 12 from ground 20. This is done by any useful sensor device known in the art such as laser beam, sound, photo-electric system or the like. Ground sensor 21 is connected electrically and mechanically with frame 14 such that, when operating, ground sensor 21 maintains trash grabber 12 at the most useful distance above the ground 20 for picking up trash 24.

Figure 3:
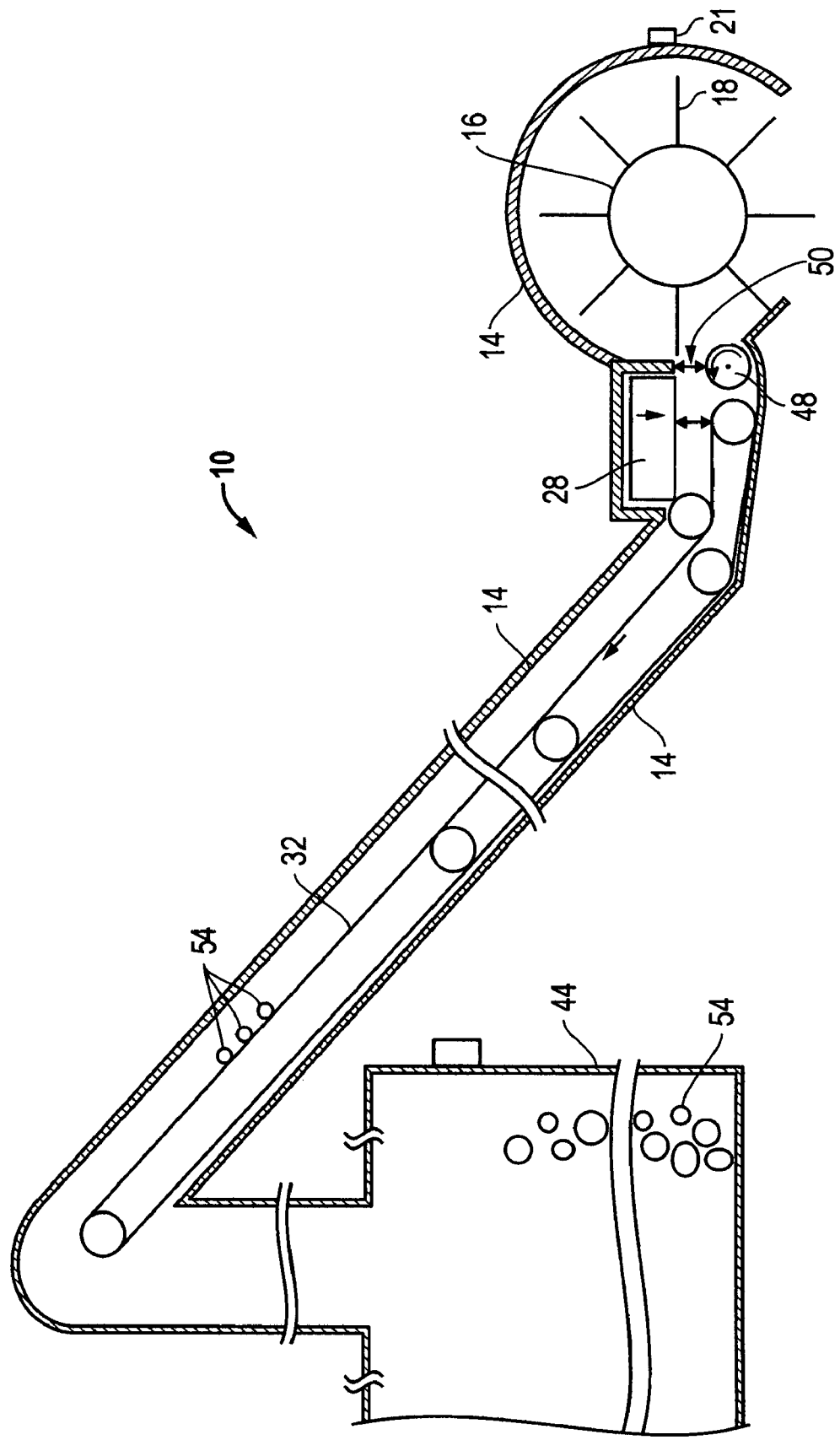
FIG. 3 is a side view of the right hand side of the trash harvester of FIG. 1.

Referring now to FIG. 3, the right hand side of trash harvester 10 and right hand conveyor 32 are more particularly illustrated. As stated above, central conveyor 28 is, preferably, magnetized and collects magnetic trash 54 from once treated trash 54 as it comes from first shredder 48. Central conveyor 28 carries the magnetic trash 54 to right hand conveyor 32 where it is dropped and/or scraped from central conveyor 28 onto right hand conveyor 32 for deposit into receptacle 44 as shown. Right hand conveyor 32 may also be magnetized as desired.

Figure 4:
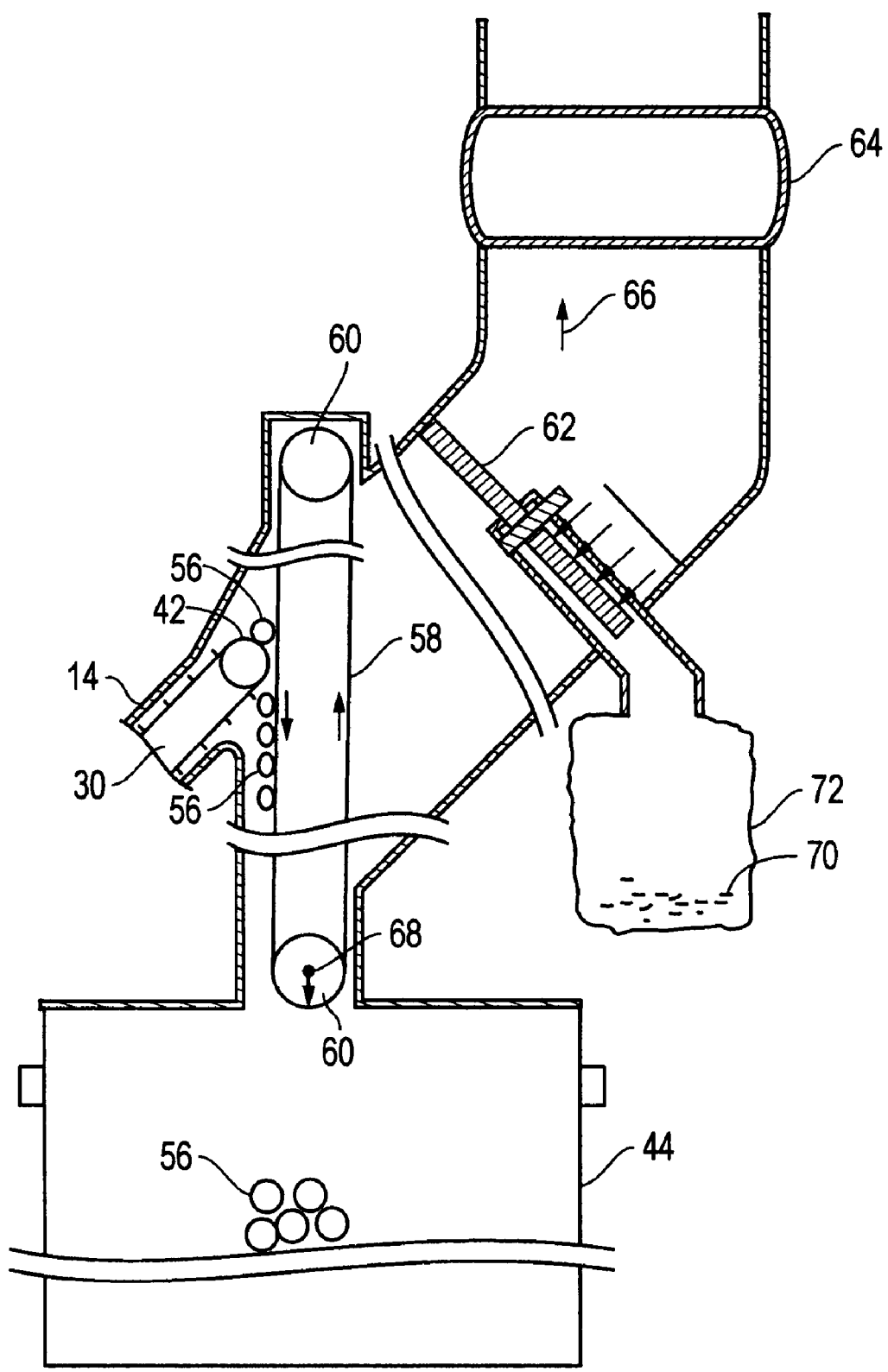
FIG. 4 is a side view of the left hand side of the trash harvester of FIG. 1.

Referring now to FIG. 4, the deposit end 42 of left hand conveyor 30 is illustrated along with other unique features of this embodiment of the invention. Filter 58 is shown in rotational position at the deposit end 42 of left hand conveyor 30. That is, as shown, filter 58 is positioned across the deposit end 42 on pulleys 60. Filter 58 may be made of any permeable material now known or hereafter developed such as fabric or wire mesh for example only and not by way of limitation. The direction of rotation of the filter 58 moves the non magnetic trash 56 into receptacle 44 which is air tight and removable as described earlier.

FIG. 4 also illustrates another aspect of the invention in which a second filter 62 filters air from the deposit end 42 of left hand conveyor 30 and receptacle 44 prior to exhausting the air to the atmosphere. Air is drawn through filter 58 and second filter 62 by blower 64 in the direction of air flow shown by arrow 66. Blower 64 is preferably a high volume low pressure blower as known in the art. Blower 64, therefore, applies a suction along the entire length of mouth 50. As a result, trash 24 is literally sucked into mouth 50. Further, trash that is usually hard to capture, loose, light weight trash, such as paper, plastic bags and the like, for example only, is especially easy to pick up with Applicant's trash harvester apparatus and method 10. Again, as shown in FIGS. 1, 2, and 3, mouth 50 runs the entire length of frame 14 from side to side and parallel to trash grabber 12. Further as has been stated above, blower 64 creates a suction along the entire length of mouth 50. This suction is enhanced by mouth 50 being narrow in comparison to the space or opening within which trash grabber 12 rotates as illustrated.

Figure 5:
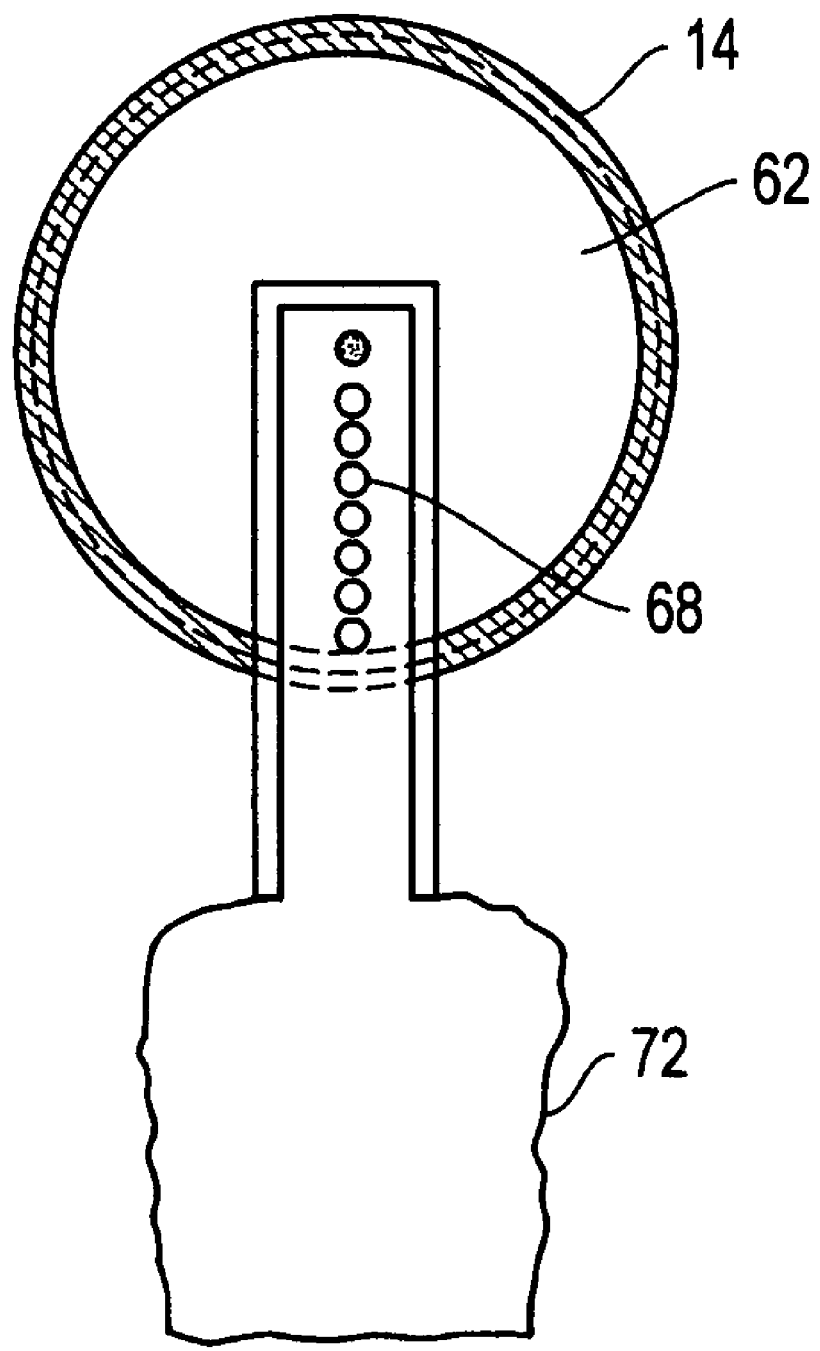
FIG. 5 is a side view of the secondary exhaust air filter of the invention.

Second filter 62 preferably is a circular shaped rotating filter that is suspended across the entire exit chimney formed in frame 14 as shown more clearly in FIG. 5. Rotating the second filter 62 enables the filter to pass by filter cleaner 68. Filter cleaner 68 is preferably a high pressure, low volume air jet or jets that blow fine pollutants 70 off of second filter 62 where they are collected in disposable air filter bag 72. Second filter 62 may be a rotating six foot diameter disc about one inch thick with weave in the range of one hundred microns, for example only.

Filter 58 may be a coarser weave, one-hundred eighty mesh for example. Likewise, filter 58 may be used in conjunction with filter cleaner 68 for cleaning filter 58 at the end of the filter 58 as it turns away from receptacle 44. This cleans filter 58 and assists in depositing non magnetic trash 56 within receptacle 44.

By way of continued explanation, the trash harvester 10 of the present invention is a motorized mechanical means to pick up trash 24, segregate magnetic trash 54 from non magnetic trash 56 and to place each type of trash in separate containers that can be emptied into a large vehicle 22 or transported to a disposal site. Importantly, all discharges form Applicant's trash harvester 10 are processed and filtered to minimize environmental impact. Further, all trash is treated, or shredded, at least once, thereby enhancing the biodegradation of the collected trash.

Applicant's trash harvester 10 may be used to pick up any trash, including leaves, tree limbs and such. In the logging industry, use of the invention may be used within hours of completion of logging and easily convert the debris into a marketable product or simply deposit the treated materials on the ground for soil enrichment. Replacement trees can be planted within days following the harvesting of trees rather than the normal months or years.

Applicant's invention also creates new demand for skilled jobs and replaces the need to rely on unskilled labor. The new skilled labor positions are safer and in a better working environment. Ten to twelve unskilled labor positions, for example, are replaced by two skilled labor positions, the harvester operator and the vehicle driver. Applicant's invention is cost effective in both labor and time. For example, roadside debris is typically a major source of complaints from the news media, citizens and visitors to elected officials. The present method of removing roadside debris is time consuming and expensive. Consequently, debris is removed only two or three times a year. With Applicant's trash harvester, every roadside can be cleaned of debris monthly at very minimum cost.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A trash harvester apparatus comprising:
   a. a trash grabber supported within a frame with an opening;
   b. a blower exhaust connected with said frame such that a suction is applied at said opening;
   c. a first trash shredder for shredding trash from said trash grabber connected with said frame next to said trash grabber;
   d. a magnetic device for picking magnetic trash from said first trash shredder connected with said frame next to said first trash shredder wherein said magnetic device is connected with a first receptacle for containing said magnetic trash;
   e. a second trash shredder connected with said frame next to said magnetic device; and
   f. an auger device for moving non-magnetic trash from said second trash shredder wherein said auger device is connected with a second receptacle for containing said non-magnetic trash.

2. The apparatus of claim 1 further comprising at least one filter connected with at least one of said first receptacle or said second receptacle.

3. The apparatus of claim 2 wherein said blower exhaust is connected with said at least one filter.

4. The apparatus of claim 3 further comprising a first filter and a second filter wherein said trash is deposited by said first filter into at least one of said receptacles and air from said at least one of said receptacles is drawn through said second filter by said blower exhaust.

5. The apparatus of claim 2 further comprising a filter cleaner connected with said at least one filter.

6. The apparatus of claim 1 wherein at least one receptacle is air tight and detachable.

7. The apparatus of claim 1 wherein said magnetic device is a magnetized conveyor conformed to pass in proximity to said trash.

8. The apparatus of claim 1 further comprising a ground sensor connected with said trash grabber for sensing the distance of said trash grabber from said ground.

9. A trash harvester apparatus comprising:
  a. a trash grabber supported in a first opening within a frame next to a second opening wherein said second opening is narrower than said first opening;
  b. a first trash shredder for shredding trash from said trash grabber connected with said frame next to said trash grabber;
  c. a magnetic device for picking magnetic trash from said first trash shredder connected with said frame next to said first trash shredder wherein said magnetic device is connected with a first receptacle for containing said magnetic trash;
  d. a second trash shredder connected with said frame next to said magnetic device
  e. an auger device for moving non-magnetic trash wherein said auger device is connected with said second trash shredder and with a second receptacle for containing said non-magnetic trash;
  f. a first filter and a second filter connected with said second receptacle wherein said non-magnetic trash from said auger device is deposited by said first filter into said second receptacle and air from said second receptacle is drawn from said second receptacle through said second filter; and
  g. a blower exhaust connected with said with said frame such that a suction is applied at said second opening and to said second filter.

10. The apparatus of claim 9 further comprising a filter cleaner connected with said second filter.

11. The apparatus of claim 9 wherein said at least one of said receptacles is air tight and detachable.

12. The apparatus of claim 9 further comprising a ground sensor connected with said trash grabber for sensing the distance of said trash grabber from said ground.

13. The apparatus of claim 9 wherein said magnetic device is a magnetized conveyor conformed to pass in proximity to said trash.

14. A method of harvesting trash comprising:
  a. providing a trash harvester with a frame with an opening including a trash grabber connected with said frame with at least one trash shredder for shredding trash from said trash grabber connected with said trash grabber, an auger device for moving trash at least one filter, a magnetic device for picking magnetic trash from said trash wherein said magnetic device is connected with a first receptacle for containing said magnetic trash, wherein said auger device moves non-magnetic trash and said auger device is connected with a second receptacle for containing said non-magnetic trash, and a blower exhaust connected with said at least one filter and with said frame such that a suction is applied to said opening; and
  b. operating said trash harvester so as to pick up trash and deposit said trash into said first or second receptacle.

15. The method of claim 14 wherein said trash harvester further includes a first filter and a second filter wherein said trash is deposited by said first filter into said second receptacle and air from said second receptacle passes through said second filter.

16. The method of claim 14 wherein at least one receptacle is detachable and further includes the steps of removing and emptying said at least one receptacle when full of trash.

17. The method of claim 14 wherein said magnetic device is a magnetized conveyor conformed to pass in proximity to said trash.

* * * * *